United States Patent
Haymore

[15] 3,679,056
[45] July 25, 1972

[54] FLOTATION APPARATUS

[72] Inventor: Ralph B. Haymore, Salt Lake City, Utah

[73] Assignee: Envirotech Corporation, Salt Lake City, Utah

[22] Filed: Aug. 13, 1970

[21] Appl. No.: 63,445

[52] U.S. Cl..............................210/221, 137/604, 137/606, 209/170, 210/220, 210/225
[51] Int. Cl..................................................................B01d
[58] Field of Search.....................209/168, 170; 261/87, 93; 210/221, 225, 226, 44, 220; 137/604, 606

[56] References Cited

UNITED STATES PATENTS

| | | | |
|---|---|---|---|
| 1,014,328 | 1/1912 | Podlesak | 137/606 X |
| 1,036,758 | 8/1912 | Walters et al. | 137/606 X |
| 2,813,074 | 11/1957 | Banks et al. | 210/221 X |
| 3,121,680 | 2/1964 | Ciabattari | 210/221 X |
| 3,418,236 | 12/1968 | Mail | 210/221 X |
| 3,446,488 | 5/1969 | Mail et al. | 210/221 X |
| 3,301,779 | 1/1967 | Kovacs | 210/221 X |

*Primary Examiner*—Robert L. Lindsay, Jr.
*Attorney*—Richard F. Bojanowski, William S. Britt, C. Harvey Gold and David V. Trask

[57] ABSTRACT

Flotation apparatus comprising an elongated tank having at one end both a submerged feed inlet and an upper froth overflow, a clarified effluent overflow at the opposite end, and a bottom outlet for removing settled solids. A mixing valve assembly is associated as a feed inlet for admixing an aeration stream with the primary feed as it enters the tank; and a trap is provided adjacent the feed inlet for removing relatively large air bubbles from the feed before it enters the main flotation zone.

7 Claims, 3 Drawing Figures

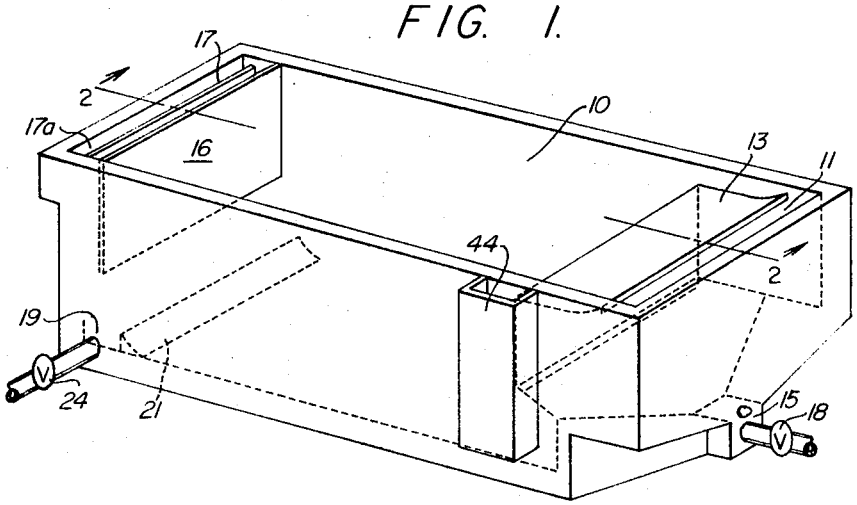
FIG. 1.
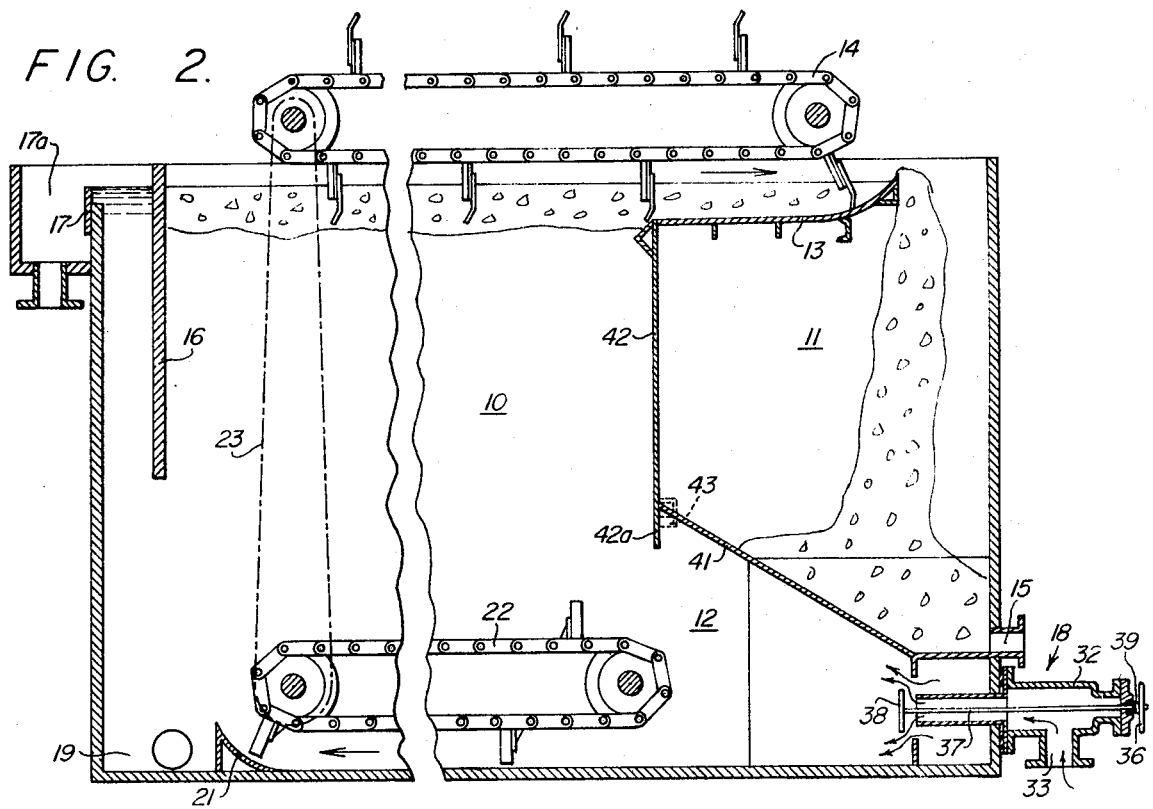
FIG. 2.
FIG. 3.
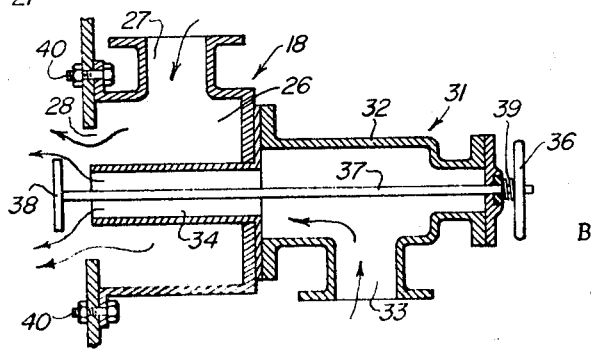
INVENTOR.
RALPH B. HAYMORE
BY William S. Britt
ATTORNEY

FLOTATION APPARATUS

BACKGROUND OF THE INVENTION

Flotation cells are well known. One form comprises a tank into which feed is introduced while froth and clarified liquid are discharged therefrom. Flotation of suspended solids is effected by air, or other gas introduced as an aerated liquid stream into a lower part of the tank. Gas is released as minute bubbles which combine with solids to form a buoyant froth which rises to the surface for collection and treatment for solids recovery. In such operations, introduction of the flotation gas may be accomplished by mixing with the primary feed a relatively small aeration stream (i.e. a pressurized liquid containing dissolved gas). Such techniques are feasible, but the mechanism for mixing the feed and aeration stream is often unwieldy and inefficient. Also, when the aeration stream is mixed with the feed under reduced pressures some large gas bubbles form which rise rapidly to the surface where they burst and destroy froth.

OBJECTS OF THE INVENTION

It is an object of this invention to provide ways and means in a flotation system whereby the primary solids-bearing feed is more efficiently admixed with pressurized aerated liquid to achieve maximum froth formation.

Another object is the provision, in flotation apparatus, of a trap for intercepting and removing relatively large gas bubbles, before their entry into the flotation zone thereby to prevent froth destruction due to bursting of said bubbles adjacent the liquid surface.

Still another object is to provide as an article of manufacture an inlet valve assembly adapted to receive and mix the primary feed stream and the aeration stream.

DESCRIPTION OF THE INVENTION

In brief, the invention provides ways and means for flotation in which improved mixing of the primary feed and aeration streams is accomplished and flotation efficiency is further enhanced by separation of undesirably large gas bubbles prior to flotation.

The flotation apparatus comprises an elongated, usually rectangular flotation tank, a surface skimming means for froth removal, a bottom sludge discharge, a valve assembly adjacent one bottom end of the tank for mixing together and introducing into the tank a primary feed and an aeration stream, the valve assembly being so arranged that the aeration stream undergoes a pressure reduction substantially at the point where it combines with the primary feed stream; and a trap interposed between said valve assembly and the final flotation zone of the tank for removing from the resulting mixture relatively large gas bubbles prior to final flotation.

A better understanding of the invention may be attained by a perusal of the following description in conjunction with the accompanying drawings which are offered by way of illustration only and are not to be taken as limiting the invention, the scope of which is defined by the appended claims and equivalents thereof.

FIG. 1 is a perspective view of a rectangular tank embodying the invention, certain parts being omitted and some internal features being shown in dotted lines for purposes of clarity.

FIG. 2 is a partial sectional view of a flotation tank embodying the invention.

FIG. 3 is an enlarged side sectional view of a mixing valve of the type employed in the apparatus illustrated in FIG. 2.

As illustrated, the flotation apparatus comprises a rectangular tank 10 having at one end both a froth discharge sump 11 and a feed conditioning chamber 12.

Froth collected on the liquid surface is pushed over the upturned edge of a shelf 13 into a sump 11 by flights of an upper endless chain rake mechanism 14. The rake mechanism may be driven by any suitable means. Froth discharges from the sump via an outlet 15.

Adjacent the opposite end of the tank is a transversely extending froth restraining baffle 16 under which clarified liquid flows to exit over a transverse weir 17 to a suitable launder 17a, for final discharge. The froth baffle 16 extends clear across the tank; its lower edge is located well below the liquid level but above the tank bottom and it extends upwardly to an elevation sufficiently above the weir 17 that froth is blocked from entering the launder. It should also be noted that the upturned edge of the froth discharge shelf 13 is at an elevation below the top of the baffle 16, but just above the overflow weir 17.

The feed conditioning chamber 12 (FIG. 2) includes a mixer-inlet valve assembly 18, hereinafter described in more detail, which receives and mixes the primary feed and an aeration stream. (As used herein, the term aeration stream means a liquid that contains air or other gas which is releasable as bubbles when pressure on the stream is reduced.) The resulting mixture is injected into a conditioning zone, subjected therein to the separation of undesirably large bubbles by means hereinafter described. The thus conditioned feed then flows into the tank proper where the released air, combined with solids as a buoyant froth, rises to the liquid surface for discharge. Because of the sloping top wall, the conditioning zone increases in cross sectional area and volume in the direction of flow. This results in a reduced velocity of the incoming feed thus maximizing the time for large bubble separation.

A sludge pocket 19 is defined on the tank bottom between a transversely extending concave baffle 21 and the end of the tank. Settled sludge is raked over this baffle into the pocket by the flights of a suitably positioned endless chain rake mechanism 22 which is similar in construction to the upper rake assembly 14 and may conveniently be driven by a chain 23 in turn driven by such upper rake mechanism 14. A suitable valve 24 is provided to regulate the rate of sludge withdrawal from the pocket.

The valve assembly 18 is mounted at one end of the tank just below the froth sump 11. It comprises a main chamber 26, a main inlet 27 for receiving the primary feed stream and an outlet port 28 providing communication with the feed conditioning chamber 12 of the tank.

A secondary valve mechanism 31 is also provided, this comprises valve housing 32, an inlet 33 to the housing, an elongated discharge tube 34 extending therefrom and a flow regulator which includes a handle 36, a stem 37 extending from the handle axially through the housing and discharge tube, and a disc 38 secured to the free end of the stem in position to throttle flow by covering and uncovering the discharge tube upon reciprocation of the stem by appropriate movement of the handle. A biasing spring 39 which may have adjustable tension means encircles the stem between the handle 36 and housing 32 and urges the disc toward the normally closed position. The size of the annulus opening between disk 38 and nozzle 34 is thereby regulated. In this manner a predetermined back pressure can be maintained on the incoming aeration stream in the housing.

The secondary valve is positioned so that the outlet end of the discharge tube 34 is aligned with and positioned concentrically within the outlet port 28 leading from the chamber 26 into the tank. Preferably, the end of the tube is in about the same plane as the wall of the chamber 26. Both the tube 34 and the cover disk 38 are of smaller diameter than the outlet port 28 so that primary feed flow may continue even when the discharge tube 34 is entirely closed.

In accordance with the invention, the entire secondary valve unit 31 is made to be detachably secured to the valve assembly by suitable fasteners such as bolts 40. Also, the entire valve assembly 18, including the secondary valve 31, is made as a detachable unit.

The sloping bottom 41 of the froth sump 11 forms an inwardly and upwardly sloping top wall of the feed conditioning chamber 12. A downward extension 42a of the inner wall 42 of the sump forms a gas interceptor or trap in the form of an inverted channel 43 extending transversely of the tank. As shown in FIG. 1, one end of the channel 43 communicates with an open-top wet well 44 mounted on the side of the tank and extending upwardly above the liquid level. This serves as a vent for gas bubbles escaping from the trap. If desired, the tank may be so constructed that the channel slopes upwardly toward the wet well to enhance gas escape.

In operation, the primary feed stream along with any desired frothing agent is introduced into the valve chamber 26 via inlet 27 and flows into the conditioning zone of the tank through the outlet 28. The pressurized aeration stream, containing dissolved air, is introduced into the secondary valve through inlet 33 thence flows, at a rate regulated by disk 38, out through the discharge tube 34 where it mixes with the primary feed stream to form a solids bearing froth which will eventually rise to the surface for collection.

Construction of the valve assembly is such that primary feed mixes with the aeration stream simultaneously with the reduction in pressure on the aeration stream as it exits the discharge tube 34. This insures good mixing of the primary feed and aeration streams as it enters the conditioning zone. In the latter zone, the mixture has some time to stabilize before entering the tank proper.

The aeration stream contains dissolved and/or entrained air which is released as minute bubbles when pressure is reduced as the stream exits the discharge tube 34. Air that is not properly dissolved may show up as undesirably large bubbles that rise rapidly to the surface where they burst with a resultant destruction of froth and the sinking of solids. In accordance with the invention, this is prevented by the bubble interceptor or trap 43. Specifically, large bubbles rise rapidly to the top wall 41 thence flow upwardly therealong to the trap 43 whence they are blocked from further movement and directed to the wet well 44 where they surface and burst harmlessly outside of the main tank area. The finer bubbles flow under the trap into the tank proper.

Action at the liquid surface in the wet well will be relatively violent. As a result, froth accumulating there will disintegrate and the included solids will resettle through the lower part of the wet well back into the tank for reflotation and discharge as froth.

I claim:

1. Flotation apparatus comprising an elongated tank with effluent discharge means for maintaining a fixed upper elevation of liquid therein, removal means for removing froth from the surface of said liquid, means for removing sludge from the bottom of said tank, valve means for introducing a pressurized aerated primary feed stream into said tank, a wall sloping upwardly from said valve means and terminating at a point intermediate said valve means and said removal means and a gas intercepting means located near the top of said sloping wall for intercepting and removing relatively large air bubbles released from said stream before said bubbles reach the surface of said liquid.

2. The apparatus of claim 1 wherein the valve means for introducing an aerated primary feed stream includes:
    a. pressure reduction means for introducing an aerated liquid influent stream into said tank through a feed inlet located at one end thereof and near the tank bottom; and
    b. means for introducing a solids contaminated liquid stream substantially concentrically about the aerated liquid influent stream.

3. The apparatus of claim 1 wherein the means for introducing an aerated primary feed stream includes a valve apparatus communicating with feed inlet located at one end of said tank and near the bottom thereof, said valve comprising a housing having inlet and discharge ports for receiving and discharging an aerated liquid influent stream, said discharge port associated with a disk to regulate flow by regulating the size of the annulus opening between said disk and said port, said disk connected to a stem passing through said housing to an external handle, and main chamber for receiving a solids contaminated liquid stream and having an outlet port aligned and positioned concentrically with the discharge port for discharging the aerated liquid influent stream.

4. The apparatus of claim 3 wherein the valve stem has an external spring associated therewith to urge said disk to a normally closed position.

5. The flotation apparatus of claim 1 wherein said gas intercepting means comprises an overhead cavity for collecting large bubbles, said cavity having means for discharging same externally to the liquid contained in said tank.

6. The flotation apparatus of claim 1 wherein said gas intercepting means comprises a baffle extending downwardly from the top of said tank to a point beyond said sloping wall to define an inverted channel therewith, and conduit means providing communication between said channel and the outside of said tank at an elevation at least as high as said fixed upper elevation liquid.

7. Flotation apparatus comprising an elongated tank with effluent discharge means for maintaining a fixed upper elevation of liquid therein and means for removing froth from the surface of said liquid, means for removing sludge from the bottom of said tank and valve means for introducing an aerated primary feed stream into said tank through an outlet near the bottom of said tank at one end thereof, said valve comprising a housing having inlet and discharge ports for receiving and discharging an aerated liquid influent stream, said discharge port associated with a disk to regulate flow by regulating the size of the annulus opening between said disk and said port, said disk connected to a stem passing through said housing to an external handle, and main chamber for receiving a solids contaminated liquid stream and having an outlet port aligned and positioned concentrically with the discharge port for discharging the aerated liquid influent stream.

* * * * *